United States Patent Office 3,434,792
Patented Mar. 25, 1969

3,434,792
1-AMINO- (AND METHYLAMINO) 2-BROMO-4-[p-(β - HYDROXYETHYL) - ANILINO] - ANTHRAQUINONE DISPERSE DYES FOR NYLON AND POLYPROPYLENE
Charles Edward Lewis, Somerville, N.J., assignor to American Cyanamid Company, Stamford, Conn., a corporation of Maine
No Drawing. Filed May 4, 1965, Ser. No. 453,203
Int. Cl. D06p 1/20, 3/00
U.S. Cl. 8—39                                      5 Claims

ABSTRACT OF THE DISCLOSURE

Two new anthraquinones, 1-amino-2-bromo-4-(p-hydroxyethylanilino) anthraquinone and 1-methyl-amino-2-bromo-4-(p-hydroxyethylanilino) anthraquinone, are outstanding disperse blue dyes for nylon and polypropylene fibers.

---

This invention relates to anthraquinone dyestuffs. More particularly, it relates to two anthraquinone compounds which are outstanding dyes for nylon and polypropylene fibers.

Heretofore, various anthraquinones have been used as dyes, mainly for cellulose and polyester fibers. However, on nylon or polypropylene they exhibit one or more serious deficiencies, such as low color value (weak shades), unlevelness, poor lightfasteness, poor fastness to crocking or gas-fading or they tend to sublime from the fabric on heating. Oftentimes, the dyeing is not blue but is a violet or blue-green. The low color value is evidence of poor affinity for the fiber.

In accordance with this invention, it has been found that two anthraquinone compounds, viz, (I) 1-amino-2-bromo-4-(p-hydroxyethyl)anilino-anthraquinone and (II) its N′-methyl derivative, whose formulas are represented below:

(I) 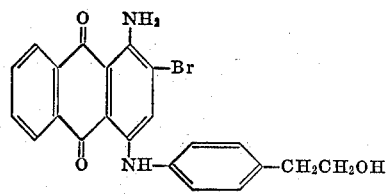

(II) 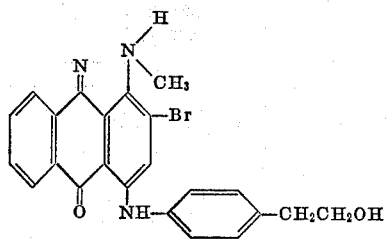

are outstanding over known closely related anthraquinone dyes for the dyeing of nylon and polypropylene. Thus, when dyed on nylon, they provide strong shades of reddish-blue color and exhibit excellent fastness to light, crocking, gas-fading and sublimation. Similarly, when dyed on polypropylene, they provide strong shades of reddish-blue and exhibit excellent fastness to light, crocking, and gas-fading.

It is, therefore, the primary object of this invention to provide new anthraquinone dyestuffs, represented by Formulas I and II above. It is a further object to provide nylon and polypropylene fibers dyed with these dyestuffs.

The compounds of this invention may be prepared by heating a 1-amino or 1-methylamino-2,4-dibromoanthraquinone in a larger alcohol such as n-butanol, with p-aminophenylethyl alcohol in the presence of a buffer such as an alkali acetate, and a copper catalyst such as cupric acetate monohydrate, with stirring at reflux until replacement of the 4-bromo group of the anthraquinone is complete. The product may be isolated by cooling the reaction mixture, mixing it with a polar solvent such as water or methanol to complete the precipitation, filtering and washing with methanol, and drying.

The invention and the advantages accruing thereto will be more fully understood by reference to the following examples and test results.

Example 1.—Preparation of 1-amino-2-bromo-4-(p-hydroxyethylanilino) anthraquinone A mixture of 19 g. 1-amino-2,4-dibromoanthraquinone, 9 g. potassium acetate, 0.2 g. cupric acetate monohydrate, 11 g. p-aminophenylethyl alcohol and 250 ml. n-butanol is heated with stirring under reflux until the reaction is complete.

The whole is cooled to 25° C. The product is collected by filtration, washed with methanol and dried at 60° C. in vacuo. Recrystallized twice from toluene, it melts at 189.5–191.5° C.

Example 2.—Preparation of 2-bromo-4-(p-hydroxyethylanilino)-1-methylaminoanthraquinone A mixture of 54.8 g. p-aminophenylethyl alcohol, 12.5 g. sodium acetate, 2.5 g. cupric acetate monohydrate and 39.5 g. 2,4 - dibromo - 1 - methylaminoanthraquinone is heated at 185° C. until the reaction is complete. The mixture is cooled to 50° C., mixed with 30 ml. monochlorobenzene and cooled to 25° C. The solution of product is clarified by filtration and evaporated. The residue is further purified by reprecipitation from acetone and Cellosolve using hexane and dilute HCl, respectively, and recrystallized from Cellosolve, M.P. 174–176.5° C.

NYLON DYEING

Example 3

The dyes of Examples 1 and 2 are separately dyed on nylon according to the following procedure.

A solution of 25 mg. of the dye in 20 ml. acetone is added to 50 ml. water containing 1 ml. 5% lauryl sodium sulfate solution and made up to 200 ml. with water.

A 5-gram wet-out skein of trilobal continuous filament nylon is entered at room temperature and the dye bath heated to 200° F. over a 20-minute period, held at 200° F. one hour, and the skein rinsed and dried.

The nylon is dyed a bright reddish-blue of good color value. When tested for fastness by standard AATCC tests, the following results are obtained.

|  | Compound No. | |
|---|---|---|
|  | I, Ex. 1 | II, Ex. 2 |
| Lightfastness | 5–6 | 4–5 |
| Fastness to sublimation (360° F.): | | |
| (a) On to cotton | 5 | 5 |
| (b) On to nylon | 5 | 5 |
| Fastness to crocking, dry | 5 | 5 |
| Fastness to crocking, wet | 5 | 5 |
| Fastness to dry cleaning, hue | 5 | 5 |
| Fastness to dry cleaning, strength | 5 | 5 |
| Fastness to gas-fading, hue | 5 | 5 |
| Fastness to gas-fading, strength | 5 | 5 |

If the —CH₂CH₂OH group is removed from the anilino group of the dye of Example 1, there is a decrease in strength, in lightfastness and in fastness to sublimation.

|  | p-Hydroxy-ethylanilino | Anilino |
|---|---|---|
| Strength (color value) | Good | Poor |
| Lightfastness | 5-6 | 3 |
| Fastness to sublimiation (360° F.): |  |  |
| (a) On to cotton | 5 | 3 |
| (b) On to nylon | 5 | 2-3 |

The dyes of this invention are of special interest for use with continuous filament nylon. They are valuable dyes for carpets and rugs made of this nylon.

POLYPROPYLENE DYEING

As is well-known, commercially available polypropylenes capable of being formed into fibers, films and other shaped articles are commonly modified to improve their dyeability by the incorporation therein of minor amounts, from about 0.8% to about 15%, by weight, of various basic nitrogen compounds, such as heterocyclic nitrogen compounds, amines, amides, etc. These basic nitrogen compound modifiers may be added to the polypropylene melt either prior to spinning or by treatment therewith after the fiber is formed. Typical of such modified polypropylenes are those shown in U.S. Patents Nos. 3,093,615, 3,098,692, 3,098,697, 3,100,133, 3,112,981 and 3,151,928, British Patents Nos. 893,604 and 919,863, and French Patents Nos. 1,307,714 and 1,320,440. The dyes of this invention are particularly applicable to modified polypropylenes of this character.

Example 4

A typical modified polypropylene was dyed with the compound of Examples 1 and 2 according to the following procedure.

A 25 mg. sample of the dye compound is dissolved in 20 ml. acetone. This is dispersed in 50 ml. water containing 1 ml. of a 5% solution of sodium lauryl sulfate. Water is added to a volume of 200 ml. A wet-out 5-gram skein of carpet fiber spun from polypropylene modified with 5% by weight of polyvinylpyridine, is added. The bath is heated to 140° F. To it is added 3 ml. of a 50% methyl salicylate emulsion. The temperature is raised slowly to 205° F. and held at this temperature for one hour. The dyed polypropylene skein is then removed and rinsed. It is scoured for ten minutes at 160° F. in a solution containing 1% of the non-ionic agent Decresol NI, a polyether alcohol, and 1% sodium carbonate.

Test results are shown below. All ratings are on a scale of 0 to 5, 5 being excellent.

|  | Compound of— | |
|---|---|---|
|  | Example 1 | Example 2 |
| Hue | (¹) | (²) |
| Strength (color value) | Good | Good |
| Gas-fading | 4-5 | 4-5 |
| Rug shampooing | 5- | 5- |

¹ Reddish-blue.
² Reddish-blue, close.

If the —CH₂CH₂OH group is removed from the anilino group of the dye of Example 1 and a —OCH₂CH₂OH group substituted, the hue becomes greener and there is a sharp drop in strength.

Strength (color value):

|  | Percent |
|---|---|
| p-Hydroxyethylanilino | 100 |
| p-Hydroxyethoxyanilino | 25 |

What is claimed is:
1. A compound of the formula

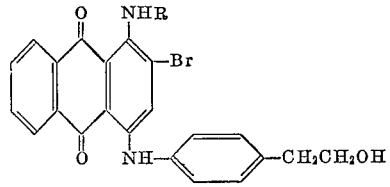

wherein R is a member selected from the group consisting of hydrogen and methyl.

2. The compound 1 - amino - 2 - bromo-4-(p-beta-hydroxy-ethylanilino)anthraquinone.
3. The compound 2-bromo-4-(p-beta-hydroxethylanilino)-1-methylaminoanthraquinone.
4. Nylon dyed with a compound of the formula

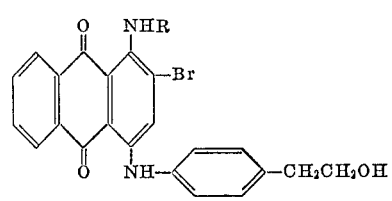

wherein R is a member selected from the group consisting of hydrogen and methyl.

5. Polypropylene modified with a basic nitrogen compound and dyed with a compound of the formula

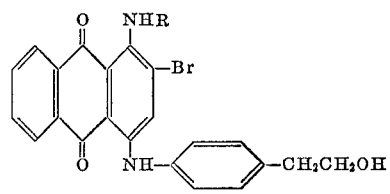

wherein R is a member selected from the group consisting of hydrogen and methyl.

References Cited

UNITED STATES PATENTS 2,353,108   7/1944   Wuertz et al. _____ 260—378
2,989,548   6/1961   Boyd et al. _____ 8—39

LORRAINE A. WEINBERGER, *Primary Examiner.*

H. C. WEGNER, *Assistant Examiner.*

U.S. Cl. X.R.

260—381